United States Patent
Kato et al.

(10) Patent No.: US 11,079,427 B2
(45) Date of Patent: Aug. 3, 2021

(54) INSPECTION DEVICE, INSPECTION SYSTEM, INTELLIGENT POWER MODULE, INSPECTION METHOD, AND COMPUTER PROGRAM PRODUCT

(71) Applicant: Kabushiki Kaisha Toshiba, Tokyo (JP)

(72) Inventors: Mitsuaki Kato, Kanagawa (JP); Akihiro Goryu, Kanagawa (JP); Kenji Hirohata, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 383 days.

(21) Appl. No.: 16/117,279

(22) Filed: Aug. 30, 2018

(65) Prior Publication Data

US 2019/0219628 A1    Jul. 18, 2019

(30) Foreign Application Priority Data

Jan. 18, 2018  (JP) .............................. JP2018-006678

(51) Int. Cl.
*G01R 31/26* (2020.01)
*G01K 7/01* (2006.01)
(Continued)

(52) U.S. Cl.
CPC .......... *G01R 31/2607* (2013.01); *G01B 7/18* (2013.01); *G01K 7/01* (2013.01); *G01L 1/20* (2013.01);
(Continued)

(58) Field of Classification Search
CPC ............. G06F 11/3457; G06F 11/3428; G06F 9/5094; G06F 1/324; G06F 2209/501; G06F 2201/865; G06F 11/3442; G06F 11/3419

See application file for complete search history.

(56) References Cited

U.S. PATENT DOCUMENTS 3,750,270 A * 8/1973 Ishii ..................... H01L 21/00
                                                        438/50
4,337,665 A * 7/1982 Sato ..................... G01L 9/065
                                                        73/708

(Continued)

FOREIGN PATENT DOCUMENTS

JP      01-290948 A    11/1989
JP      04-307331 A    10/1992
(Continued)

OTHER PUBLICATIONS

Yang et al. "On the Study of MOSFET Micro-Sensors for Electronic Packaging" 2007 International Conference on Electronic Materials and Packaging [retrieved on Nov. 5, 2020]. (Year: 2007).*

(Continued)

*Primary Examiner* — Rehana Perveen
*Assistant Examiner* — Alfred H B Wechselberger
(74) *Attorney, Agent, or Firm* — Finnegan, Henderson, Farabow, Garrett & Dunner L.L.P.

(57) ABSTRACT

An inspection device comprises: a detecting unit that is connected to a plurality of semiconductor chips having mutually different rates of change of electrical resistance with respect to stress loading direction, and that detects an electrical resistance value of each semiconductor chip from electric current flowing in each semiconductor chip; a first memory unit that is used to hold model data meant for converting an electrical resistance value into a characteristic value indicating at least either temperature, or stress, or strain; a converting unit that converts the electrical resistance value of each semiconductor chip as detected by the detecting unit into the characteristic value using the model data held in the first memory unit; and a second memory unit that is used to store the characteristic value, which is (Continued)

obtained by conversion by the converting unit, as time-series data for each of the plurality of semiconductor chips.

16 Claims, 9 Drawing Sheets

(51) Int. Cl.
    *G01B 7/16*     (2006.01)
    *G01L 1/20*     (2006.01)
    *H01L 29/16*     (2006.01)
    *H01L 25/18*     (2006.01)
    *G06F 30/20*     (2020.01)
    *G06F 30/23*     (2020.01)
    *G06F 30/367*     (2020.01)

(52) U.S. Cl.
    CPC .............. *G06F 30/20* (2020.01); *G06F 30/23* (2020.01); *G06F 30/367* (2020.01); *G01B 7/20* (2013.01); *G01K 2217/00* (2013.01); *H01L 25/18* (2013.01); *H01L 29/1608* (2013.01)

(56) References Cited

U.S. PATENT DOCUMENTS

| | | | |
|---|---|---|---|
| 2003/0140713 A1 | 7/2003 | Ohsato et al. | |
| 2005/0081645 A1 | 4/2005 | Ohsato et al. | |
| 2007/0246776 A1* | 10/2007 | Moroz | H01L 21/823807 257/349 |
| 2009/0065867 A1* | 3/2009 | Yin | H01L 29/7843 257/351 |
| 2011/0224951 A1* | 9/2011 | Kim | G06F 30/00 703/1 |
| 2011/0309357 A1* | 12/2011 | Tain | G01L 1/2206 257/48 |
| 2018/0188313 A1* | 7/2018 | Paikin | G01R 31/2628 |

FOREIGN PATENT DOCUMENTS

| | | |
|---|---|---|
| JP | 11-064124 A | 3/1999 |
| JP | 4011345 B2 | 11/2007 |
| JP | 4329477 B2 | 9/2009 |

OTHER PUBLICATIONS

Sakamoto et al. "Time evolution of strain distribution during ultrasonic bonding of Cu wire" EMPC 2017, Warsaw, Poland [retrieved on Nov. 5, 2020]. (Year: 2017).*

Koganemaru et al. "Device Simulation for Evaluating Effects of Inplane Biaxial Mechanical Stress on n-Type Silicon Semiconductor Devices" IEEE Tran. on Electron Devices, vol. 58, No. 8 [retrieved on Nov. 5, 2020] (Year: 2011).*

Marcault et al. "Study of mechanical stress impact on the I-V characteristics of a power VDMOS device using 2D FEM simulations" Microelectronics Reliability vol. 52, pp. 489-496 [retrieved on Nov. 3, 2020] (Year: 2012).*

Koganemaru et al. "Residual stress evaluation in resin-molded IC chips using finite element analysis and piezoresistive gauges" Microelectronics Reliability vol. 48, pp. 923-932 [retrieved on Nov. 4, 2020]. (Year: 2008).*

Balachandran et al. "High Quality Low Offcut 4h-Sic Epitaxy and Integrated Growth of Epitaxial Graphene for Hybrid Graphene/Sic Devices" [thesis] University of South Carolina, Electrical Engineering [retrieved on Nov. 4, 2020] (Year: 2017).*

Goth et al. "Experimental Characterization and Finite Element Analysis of Thermo-Mechanical Stress in Flip-Chip- and Wirebond-Assemblies on Flexible and Injection Molded Thermoplastic Substrates" 2012 4th Electronic System-Integration Technology Conference [retrieved on Nov. 6, 2020] (Year: 2012).*

Hu et al. "Failure and Reliability Analysis of a SiC Power Module Based on Stress Comparison to a Si Device" [retrieved on Nov. 3, 2020] IEEE Trans on Device and Materials Reliability vol. 17, No. 4 [retrieved on Nov. 3, 2020] (Year: 2017).*

Kato et al., "Development of Evaluation Method for Mechanical Stress Dependence of SiC Power Module by Electro-Thermal-Stress Coupled Analysis," Proc. The 32th JIEP Annual Meeting, Nada, Japan (Mar. 2018), 4 pages, and translation, 6 pages.

* cited by examiner

INSPECTION DEVICE, INSPECTION SYSTEM, INTELLIGENT POWER MODULE, INSPECTION METHOD, AND COMPUTER PROGRAM PRODUCT

CROSS-REFERENCE TO RELATED APPLICATIONS

This application is based upon and claims the benefit of priority from Japanese Patent Application No. 2018-006678, filed on Jan. 18, 2018; the entire contents of which are incorporated herein by reference.

FIELD

Embodiments described herein relate generally to an inspection device, an inspection system, an intelligent power module, an inspection method, and a computer program product.

BACKGROUND

In recent years, a semiconductor module in which one or more semiconductor devices are installed has become indispensable as a key component in a wide range of fields. For example, a power semiconductor module is used not only in industry or in medical equipment but also in railroads or in automobiles; and is demanded to have a high level of reliability for being competent for use under severe conditions over a long period of time in units of a few years.

DETAILED DESCRIPTION

Figure 1:
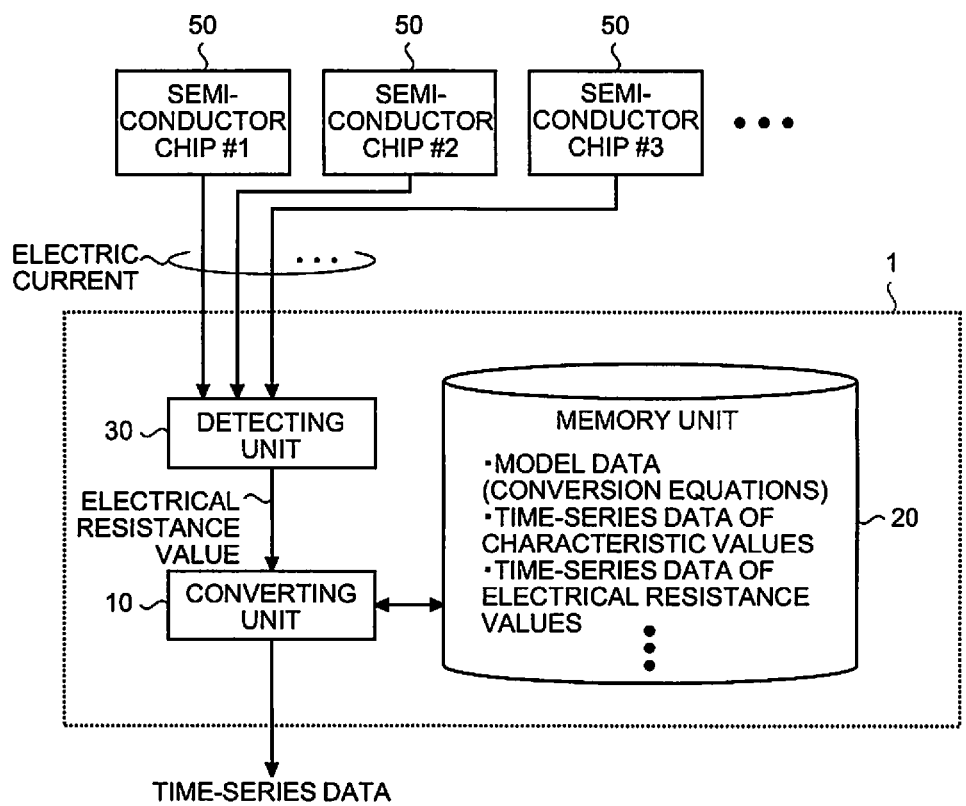
FIG. 1 is a block diagram illustrating an exemplary overall configuration of an inspection device (or an inspection system) according to a first embodiment.

Exemplary embodiments of an inspection device, an inspection system, an intelligent power module, an inspection method, and a computer program product are described below in detail with reference to the accompanying drawings.

As described earlier, semiconductor modules of recent years are demanded to have a high level of reliability. For example, in the field of railroads or automobiles, since it is conceivable that any failure in equipment leads to a major accident, there is a particular demand for enhancement in the level of reliability of semiconductor modules.

In order to achieve enhancement in the level of reliability of a semiconductor module; it is important that, in a composite area of electricity/heat/stress, a cohesive analysis system is developed that also covers the situations in the actually-used environment. As the input data to such an analysis system, it is believed that the data of temperature/stress/strain inside a semiconductor module is useful.

Conventionally, monitoring of temperature/stress/strain in a semiconductor module is performed by installing additional components such as a temperature sensor and a strain sensor inside the semiconductor module. However, in order to further achieve downsizing/high thermos-stabilization/low cost, it is desirable to be able to identify the temperature, or the stress, or the strain without installing, as much as possible, additional components such as sensors inside the semiconductor module. In that regard, for example, a method in which the temperature or the stress inside a semiconductor module is identified using the electrical signals flowing inside the semiconductor module is believed to be effective. Moreover, in order to achieve a higher degree of accuracy, a method in which the temperature or the stress inside a semiconductor module is identified using the information about additional components such as sensors as well as using the information about the semiconductor module is believed to be effective.

However, any change in the electrical characteristics of a semiconductor is dependent not only on the stress and the temperature but also on the stress direction. For example, in a silicon carbide (SiC) single crystal, if compressional stress or tensile stress is applied to the (0001) face in the <11-20> direction, then there are times when the electrical resistance in the <11-20> direction decreases or increases to a greater extent as compared to the <1-100> direction. Moreover, even in a commonly-used semiconductor made of silicon (Si), or gallium nitride (GaN), or gallium oxide ($Ga_2O_3$); there are times when the rate of change of electrical resistance differs according to the direction of stress applied to the semiconductor chips.

Besides, as far as power semiconductor modules of recent years are concerned, what is called an intelligent power module has been developed by having a memory or an arithmetic circuit installed inside the module; and there is a demand for creating new value-added products using the data recording function and the information processing function of the intelligent power module.

In that regard, in the embodiments described below, with reference to a few examples, the explanation is given about an inspection device, an inspection system, an intelligent power module, an inspection method, and a computer program product that enable achieving enhancement in the level of reliability of a semiconductor module as a result of obtaining the data of temperature/stress/strain inside the semiconductor module.

First Embodiment

Firstly, a first embodiment of an inspection device, an inspection system, an inspection method, and a computer program product is described below in detail with reference to the accompanying drawings. In the first embodiment, from the rate of change of electrical resistance (the resistance change rate) at the time of application of stress or temperature to a semiconductor from outside, the temperature of the semiconductor or the stress in each direction in the semiconductor is obtained. At that time, in the first embodiment, the dependency of the resistance change rate with respect to the direction of stress occurring in the semiconductor (also called the stress loading direction) is taken into account. As a result, the temperature/stress/strain inside the semiconductor can be identified in detail and with accuracy, thereby enabling implementation of an inspection device, an inspection system, an inspection method, and a computer program product that enable achieving enhancement in the reliability of the semiconductor module.

FIG. 1 is a block diagram illustrating an exemplary overall configuration of an inspection device (or an inspection system) according to the first embodiment. As illustrated in FIG. 1, an inspection device 1 includes a converting unit 10, a memory unit 20, and a detecting unit 30.

The detecting unit 30 is connected to, for example, a plurality of semiconductor chips 50; receives input of the electric current that flows during the operations of the semiconductor elements configured in each semiconductor chip 50; and, from the relationship between the input electric current and the voltage applied for operating the semiconductor elements (hereinafter, called current-voltage characteristic), detects the value of on-resistance of the semiconductor elements (hereinafter, the on-resistance of the semiconductor chip 50) as the electrical resistance value. Then, the detecting unit 30 inputs the electrical resistance value detected for each semiconductor chip 50 to the converting unit 10.

The memory unit 20 is a memory area configured using, for example, a dynamic random access memory (DRAM) (including a synchronous DRAM (SDRAM)) or a static random access memory (SRAM). However, that is not the only possible case. Alternatively, various memory devices such as a flash memory, a hard disk drive, or a magnetic tape recorder can be used in the memory unit 20.

The memory unit 20 is used to hold model data that is meant for converting an electrical resistance value into a value indicating temperature, or stress, or strain of the semiconductor chip 50 (hereinafter, called a characteristic value). For example, the model data can represent a conversion equation that takes an electrical resistance value as the input and outputs a characteristic value, or can represent a conversion table in which the correspondence relationship between electrical resistance values and characteristic values is registered in advance. Regarding an example of the conversion equation, the explanation is given later.

The converting unit 10 is connected to the memory unit 20, and converts an electrical resistance value into a characteristic value using the model data read from the memory unit 20. Then, the converting unit 10 inputs, to the memory unit 20, the electrical resistance value input from the detecting unit 30 and the characteristic value obtained as a result of conversion of the electrical resistance value. In the memory unit 20, the input electrical resistance values and the input characteristic values are stored in chronological order while being distinguished according to the semiconductor chips 50. As a result, in the memory unit 20, time-series data of the electrical resistance values and time-series data of the characteristic values is held for each semiconductor chip 50. Meanwhile, alternatively, the electrical resistance values can be directly input to the memory unit 20 from the detecting unit 30. Moreover, in the first embodiment, although the model data, the time-series data of the characteristic values, and the time-series data of the electrical resistance values are stored in the common memory unit 20, that is not the only possible configuration. Alternatively, each type of data can be stored in a different memory unit.

The converting unit 10 reads the time-series data of the characteristic values and the time-series data of the electrical resistance values from the memory unit 20, and outputs the data to the outside. The time-series data that is output to the outside can be used in an analysis operation for cohesively analyzing, in a composite area of electricity/heat/stress, the characteristics and the condition of the semiconductor chips 50 while also covering the situations in the actually-used environment. Examples of such an analysis operation include various analysis operations related to the reliability of the semiconductor chips 50, such as a failure prediction operation (also called a life prediction operation) for predicting the failure time of each semiconductor chip 50. However, the time-series data of the characteristic values and the time-series data of the electrical resistance values are not limited to be used in such an analysis operation, and can be used for various purposes.

Figure 2:
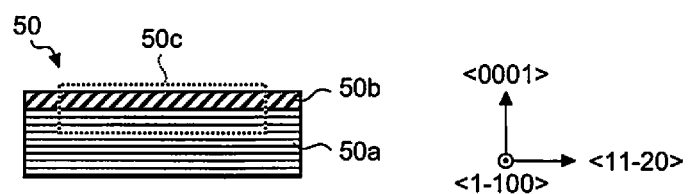
FIG. 2 is a cross-sectional view of an example of a semiconductor chip according to the first embodiment.

Given below is the explanation of the semiconductor chips 50 illustrated FIG. 1. Each semiconductor chip 50 is a semiconductor device in which, for example, unipolar semiconductor elements or bipolar semiconductor elements are configured on a silicon carbide (SiC) substrate. In FIG. 2 is illustrated an example of the semiconductor chip 50 according to the first embodiment. As illustrated in FIG. 2, the semiconductor chip 50 includes an SiC substrate 50a representing a semiconductor substrate, and includes an SiC epitaxial film 50b formed on the element formation face that is either parallel to or inclined at a predetermined off-angle with respect to the (0001) face of the SiC substrate. On the element formation face of the SiC substrate and on the SiC epitaxial film 50b, an element formation area 50c is provided in which various semiconductor elements such as unipolar semiconductor elements and bipolar semiconductor elements are formed. In a unipolar semiconductor element, only either electrons or the positive holes are involved in electrical conduction at the time when the current is carried. Examples of the unipolar semiconductor element include a Schottky barrier diode (SBC), a junction field-effect transistor (J-FET), and a metal-oxide silicon field-effect transistor (MOS-FET). In a bipolar semiconductor element, electrons as well as the positive holes are involved in electrical conduction. Examples of a bipolar semiconductor element include a PN junction diode, a bipolar junction transistor (BJT), a thyristor, a gate turnoff thyristor (GTO thyristor), and an insulated gate bipolar transistor (IGBT).

Figure 3:
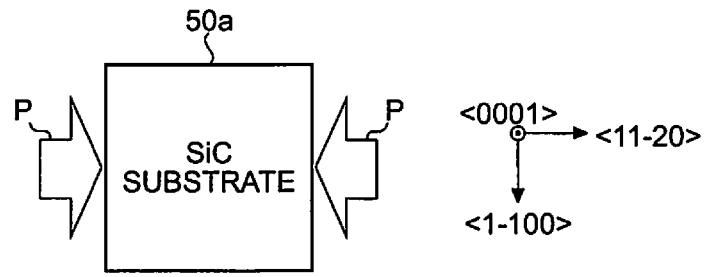
FIG. 3 is a diagram for explaining the direction of stress applied to the semiconductor chip according to the first embodiment.

In each semiconductor chip 50 having such a configuration, as described earlier, the electrical characteristics of the semiconductor chip 50 change not only according to the stress and the temperature but also according to the stress loading direction. For example, in the semiconductor chip 50 in which the SiC substrate 50a is used as the semiconductor substrate as illustrated in FIG. 3, when compressional stress P is applied on the (0001) face of the SiC substrate 50a along the <11-20> direction, there are times when the electrical resistance in the <11-20> direction decreases to a greater extent as compared to the <1-100> direction. On the other hand, when tensile stress is applied along the <11-20> direction, there are times when the electrical resistance in the <11-20> direction increases to a greater extent as compared to the <1-100> direction. In an identical manner, even when a commonly-used semiconductor substrate such as a silicon (Si) substrate, or a gallium nitride (GaN) substrate, or a gallium oxide ($Ga_2O_3$) substrate is used; the electrical characteristics of the semiconductor chip 50 change not only according to the stress and the temperature but also according to the stress loading direction. The following explanation is given about an example in which the semiconductor chip 50 is configured using the SiC substrate 50a.

Figure 4:
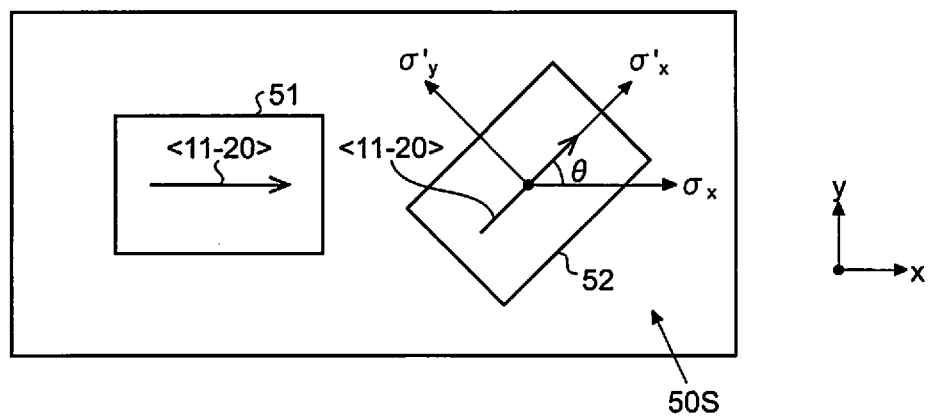
FIG. 4 is a diagram illustrating an exemplary mounting layout of the semiconductor chips according to the first embodiment.

In the first embodiment, as illustrated in FIG. 4, for example, when a plurality of semiconductor chips 50 (in FIG. 4, two semiconductor chips 51 and 52) is to be installed on a mounting face 50S on which the stress applied to the installed semiconductor chips 50 (hereinafter, called mounting stress) has a uniform direction, the semiconductor chips 50 are arranged to have mutually different directions. As a result, from the difference in the electrical resistance values obtained from the semiconductor chips 50, the characteristic value of each semiconductor chip 50 can be obtained in a more accurate manner. Meanwhile, in the example illustrated in FIG. 4, in each of the semiconductor chips 51 and 52, the orientation of the semiconductor elements (for example, the direction of flow of the electric current in the channel) is assumed to be identical with respect to the crystal direction of the SiC substrate 50a.

Figure 5:
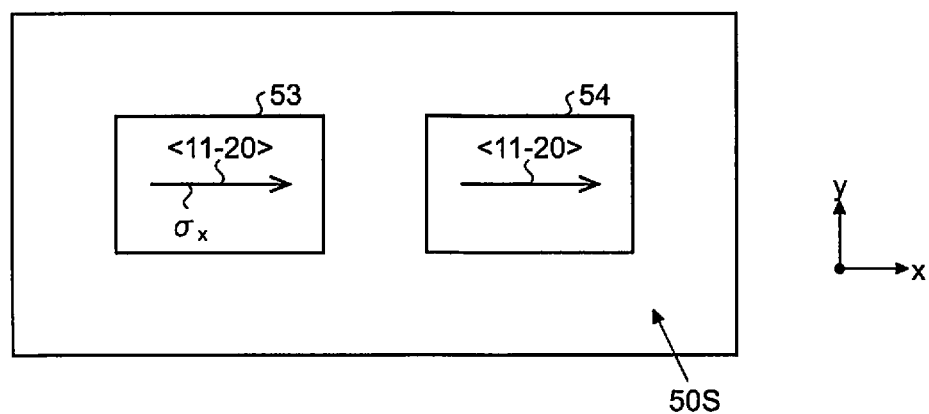
FIG. 5 is a diagram illustrating another exemplary mounting layout of the semiconductor chips according to the first embodiment.

However, in the case in which a plurality of semiconductor chips 50 differ in the characteristics of the SiC substrate 50a and/or the SiC epitaxial film 50b (for example, the stress and the rate of change of resistance value with respect to the stress direction), or differ in the orientation of the semiconductor elements with respect to the crystal direction of the SiC substrate 50a, or differ in some other device structure/characteristics; then the semiconductor chips 50 (in FIG. 5, two semiconductor chips 53 and 54) can be installed in alignment on the mounting face 50S as illustrated in FIG. 5. Even with such a configuration, from the difference in the electrical resistance values obtained from the semiconductor chips 50, the characteristic value of each semiconductor chip 50 can be obtained in a more accurate manner.

Moreover, in the case in which a plurality of semiconductor chips 50 differ in the characteristics of the SiC substrate 50a and/or the SiC epitaxial film 50b (for example, the rate of change of the resistance value with respect to stress and its direction), or differ in the orientation of the semiconductor elements with respect to the crystal direction of the SiC substrate 50a, or differ in some other device structure/characteristics; then the semiconductor chips 50 can be installed to have mutually different directions as illustrated in FIG. 4. Even with such a configuration, from the difference in the electrical resistance values obtained from the semiconductor chips 50, the characteristic value of each semiconductor chip 50 can be obtained in a more accurate manner.

In the following explanation, as illustrated in FIG. 4, when a plurality of semiconductor chips 50 have the same characteristics of the SiC substrate 50a, have the same orientation of the semiconductor elements with respect to the crystal direction of the SiC substrate 50a, and have the same device structure/characteristics; the semiconductor chips 50 are referred to as "the semiconductor chips 50 having the same characteristics". On the other hand, as illustrated in FIG. 5, when a plurality of semiconductor chips 50 differ in the characteristics of the SiC substrate 50a, differ in the orientation of the semiconductor elements with respect to the crystal direction of the SiC substrate 50a, and differ in the device structure/characteristics; the semiconductor chips 50 are referred to as "the semiconductor chips 50 having different characteristics".

Given below is the explanation of an example of model data according to the first embodiment. The following explanation is given for a case in which conversion equations are treated as model data.

Herein, Equation (1) given below represents an example of the conversion equation that is meant for converting an electrical resistance value into a value of temperature or stress (i.e., a characteristic value). In conversion equation (1), an on-resistance change $\Delta R_{on}$ of the semiconductor chip 50 is separated into an on-resistance $R_{on}$ in the state in which no stress is applied to the semiconductor chip 50 (hereinafter, called no-stress state) and an on-resistance change rate $r_p$ in the state in which stress is applied to the semiconductor chip 50 (hereinafter, called stress-applied state).

$$\Delta R_{on} = R_{on} \times r_p \quad (1)$$

In conversion equation (1), the on-resistance change $\Delta R_{on}$ represents, for example, a value set from a data sheet or from actual measured values. The on-resistance change rate $r_p$ is a value obtained using conversion equation (2) given below.

$$r_p = r_p(\sigma_x, \sigma_y, T_j) \quad (2)$$
$$= \{\alpha_x(T_j - T_0) + 1\}\beta_x\{\gamma_x(T_j - T_0) + \sigma_{x,f} + \sigma_{x,o}\} +$$
$$\{\alpha_y(T_j - T_0) + 1\}\beta_y\{\gamma_y(T_j - T_0) + \sigma_{y,f} + \sigma_{y,o}\}$$

In conversion equation (2), α represents a coefficient indicating the relationship between the temperature and the resistance change rate. Moreover, β represents a coefficient indicating the relationship between the stress and the resistance change rate. Furthermore, γ represents a coefficient indicating the relationship between the temperature and the heat stress. Moreover, $\sigma_o$ represents a value of the external stress (external force). Furthermore, $\sigma_f$ represents a value of the residual stress remaining in the semiconductor chip 50 at the time of mounting (hereinafter, called mounting stress). Moreover, $T_j$ represents the junction temperature. Furthermore, $T_0$ represents the reference temperature at the time of setting the coefficients α, β, and γ. Moreover, suffixes x and y represent space coordinates.

In this way, the on-resistance change rate $r_p$ that is attributed to the stress-applied state is dependent on stress $\sigma_x$ and stress $\sigma_y$ in each direction and dependent on the junction temperature $T_j$. Meanwhile, the stress $\sigma_x$ and the stress $\sigma_y$ can be divided into heat stress $\gamma(T_j - T_0)$ during driving, the mounting stress $\sigma_f$, and the external force $\sigma_o$.

The coefficients α, β, and γ can be obtained in advance according to the empirically-obtained actual measured values, or according to device simulation of the semiconductor chip 50, or according to structural analysis, or according to a combination thereof. Moreover, the mounting stress $\sigma_f$ can be obtained in advance according to Raman spectrometry, or according to device simulation, or according to structural analysis, or according to a combination thereof.

If conversion equation (2) given earlier is applied in the case in which n number of semiconductor chips 50 are disposed (where n is an integer equal to or greater than one) and in which the stress component in m number of directions (where m is an integer equal to or greater than one) is taken into account, the on-resistance change rates $r_{p1}$ to $r_{pm}$ of each of the n number of semiconductor chips 50 are expressed as given below in Equation (3).

$$\begin{cases} r_{p1} = a_{11}\sigma_1 + a_{12}\sigma_2 + \Lambda + a_{1m}\sigma_m \\ r_{p2} = a_{21}\sigma_1 + a_{22}\sigma_2 + \Lambda + a_{2m}\sigma_m \\ \quad M \\ r_{pn} = a_{n1}\sigma_1 + a_{n2}\sigma_2 + \Lambda + a_{nm}\sigma_m \end{cases} \quad (3)$$

Herein, an on-resistance change rate vector $<r_p>$, a stress vector $<\sigma>$, and a matrix A are defined as given below in Equation (4). Meanwhile, in the present written description, a character enclosed in "< >" represents a vector.

$$\rho_{r_p} = \begin{bmatrix} r_{p1} \\ r_{p2} \\ M \\ r_{pm} \end{bmatrix}, \rho_\sigma = \begin{bmatrix} \sigma_1 \\ \sigma_2 \\ M \\ \sigma_m \end{bmatrix}, A = \begin{bmatrix} \sigma_{11} & \sigma_{12} & \Lambda & \sigma_{1m} \\ \sigma_{21} & \sigma_{22} & \Lambda & \sigma_{2m} \\ M & M & O & M \\ \sigma_{n1} & \sigma_{n2} & \Lambda & \sigma_{nm} \end{bmatrix} \quad (4)$$

As a result, Equation (3) given earlier can be expressed as Equation (5) given below.

$$\rho_{r_p} = A \rho_\sigma \quad (5)$$

When n=m holds true, the stress vector $<\sigma>$ can be obtained as given below in Equation (6) by calculating the inverse matrix $A^{-1}$ of the matrix A according to an arbitrary known calculation method such as Gaussian elimination.

$$\rho_\sigma = A^{-1} \rho_{r_p} \quad (6)$$

On the other hand, when n≠m holds true, the stress vector $<\sigma>$ can be obtained according to an arbitrary known calculation method such as the least-square method or some other statistical method.

Meanwhile, herein, although the explanation till now is targeted only at the stress component parallel to each direction, it is alternatively possible to consider any arbitrary stress such as shear stress, maximum principal stress, minimum principal stress, or Von Mises stress. Moreover, regarding the on-resistance change rate $r_p$ given in Equation (2), Equation (3), or Equation (5); the stress σ (or the vector or the tensor thereof) can be substituted with strain (or the vector or the tensor thereof), or a conversion equation regarding stress and strain can be separately used in addition to the equations mentioned above. That is, the conversion equation of the on-resistance change rate $r_p$ according to the first embodiment can be configured using at least either the temperature, or the stress in each direction, or the strain component in each direction. At that time, the stress component in each direction can include at least either the heat stress component, or the mounting stress component, or the external force component. Moreover, the strain component in each direction can include at least either the heat strain component, or the strain component attributed to mounting, or the strain component attributed to external force.

Temperature calculation: when external force and mounting stress are known

Given below is the explanation of a specific calculation example in the case of using two semiconductor chips 50. For example, when the external force $\sigma_o$ and the mounting stress $\sigma_f$ are known (including the case in which both types of stress are not applied); in the on-resistance change rate $r_p$ given below in conversion equation (7), the parameters other than the temperature can be treated as coefficients a, b, and c.

$$r_p = \{\alpha_x(T_j - T_0) + 1\}\beta_x\{\gamma_x(T_j - T_0) + \sigma_{x,f} + \sigma_{x,0}\} + \quad (7)$$
$$\{\alpha_y(T_j - T_0) + 1\}\beta_y\{\gamma_y(T_j - T_0) + \sigma_{y,f} + \sigma_{y,0}\}$$
$$= aT_j^2 + bT_j + c$$

As a result, the junction temperature $T_j$ can be obtained using a quadratic formula as given below in Equation (8).

$$T_j = \frac{-b + \sqrt{b^2 - 4ac}}{2a} \quad (8)$$

Calculation of stress in x and y directions: when temperature is known

When the junction temperature $T_j$ is known (including the case in which the junction temperature $T_j$ is equal to the reference temperature $T_0$); in the on-resistance change rate $r_p$ given below in conversion equation (9), the parameters other than the stress ($\sigma_o$ and $\sigma_f$) can be treated as coefficients a and b.

$$r_p = \{\alpha_x(T_j - T_0) + 1\}\beta_x\{\gamma_x(T_j - T_0) + \sigma_{x,f} + \sigma_{x,0}\} + \quad (9)$$
$$\{\alpha_y(T_j - T_0) + 1\}\beta_y\{\gamma_y(T_j - T_0) + \sigma_{y,f} + \sigma_{y,0}\}$$
$$= a\sigma_x + b\sigma_y$$

Case in which semiconductor chips have different characteristics

For example, as illustrated in FIG. 5, when two semiconductor chips 50 having different characteristics are arranged to have the same orientation on the mounting face 50S, the on-resistance change rate $r_{p1}$ of the semiconductor chip 53 and the on-resistance change rate $r_{p2}$ of the semiconductor chip 54 are expressed as given below in Equation (10).

$$\begin{cases} r_{p1} = a_{1x}\sigma_x + a_{1y}\sigma_y \\ r_{p2} = a_{2x}\sigma_x + a_{2y}\sigma_y \end{cases} \quad (10)$$

Thus, the stress c of the semiconductor chip 53 and the stress $\sigma_y$ of the semiconductor chip 54 can be obtained using Equation (11) given below.

$$\begin{Bmatrix} \sigma_x \\ \sigma_y \end{Bmatrix} = \frac{1}{a_{1x}a_{2y} - a_{2x}a_{1y}} \begin{bmatrix} a_{2y} & -a_{1y} \\ -a_{2x} & a_{1x} \end{bmatrix} \begin{Bmatrix} r_{p1} \\ r_{p2} \end{Bmatrix} \quad (11)$$

Case in which semiconductor chips have same characteristics

On the other hand, as illustrated in FIG. 4, when the two semiconductor chips 51 and 52 having the same characteristics are arranged to have mutually different orientations on the mounting face 50S, the on-resistance change rate $r_{p1}$ of the semiconductor chip 51 and the on-resistance change rate $r_{p2}$ of the semiconductor chip 52 are expressed as given below in Equation (12).

$$\begin{cases} r_{p1} = a_{1x}\sigma_x + a_{1y}\sigma_y \\ r_{p2} = a_{1x}\sigma'_x + a_{1y}\sigma'_y \end{cases} \quad (12)$$

Moreover, stress $\sigma'_x$ and stress $\sigma'_y$ of the semiconductor chip 52 can be obtained using Equation (13) given below.

$$\begin{cases} \sigma'_x = \sigma_x\cos\theta + \sigma_y\sin\theta \\ \sigma'_y = \sigma_x\sin\theta + \sigma_y\cos\theta \end{cases} \quad (13)$$

When Equation (13) is substituted in Equation (12), coefficients $a_{2x}$ and $a_{2y}$ can be obtained as given below in Equation (14). In Equations (12) and (14), coefficients $a_{1x}$ and $a_{1y}$ represent coefficients for the semiconductor chip 51 in which the <11-20> direction of the SiC substrate 50a is coincident with the stress loading direction, and the coefficients $a_{2x}$ and $a_{2y}$ represent coefficients for the semiconductor chip 52 in which the <11-20> direction of the SiC substrate 50a is inclined by an angle θ with respect to the stress loading direction.

$$\begin{cases} \sigma_{2x} = \sigma_{1x}\cos\theta - \sigma_{1y}\sin\theta \\ \sigma_{2y} = \sigma_{1x}\sin\theta + \sigma_{1y}\cos\theta \end{cases} \quad (14)$$

As a result, Equation (12) given earlier can be converted as given below in Equation (15).

$$\begin{cases} r_{p1} = a_{1x}\sigma_x + a_{1y}\sigma_y \\ r_{p2} = a_{2x}\sigma_x + a_{2y}\sigma_y \end{cases} \quad (15)$$

Herein, Equation (15) is identical to Equation (10). Hence, the stress $\sigma_x$ and the stress $\sigma_y$ can be obtained from Equation (11) given earlier.

Meanwhile, in the configurations illustrated in FIGS. 5 and 4, the <11-20> direction of the SiC substrate 50a in at least one of the semiconductor chips 50 can be substantively coincident with the direction of mounting stress (when a plurality of types of stress is present, the main stress loading direction). In that case, in the semiconductor chip 50 in which the <11-20> direction is substantively coincident with the direction of mounting stress, there are times when the electrical resistance value sensitively changes against the stress. Hence, the characteristic value of each semiconductor chip 50 can be obtained in a more accurate manner.

Calculation of mounting stress/external force in x and y directions: when temperature is known As described above, when the junction temperature $T_j$ is known (including the case in which the junction temperature $T_j$ is equal to the reference temperature $T_0$), the on-resistance change rate $r_p$ can be expressed using conversion equation (9). Herein, if the external force $\sigma_o$ is known (including the case in which no external force is loaded); as a result of simplifying conversion equation (9), it becomes possible to calculate the mounting stress $\sigma_f$ in the x and y directions using Equation (16) given below.

$$\sigma_{x,f} = \sigma_x - y_x(T_j - T_0) - \sigma_{x,0}$$

$$\sigma_{y,f} = \sigma_y - y_y(T_j - T_0) - \sigma_{y,0} \quad (16)$$

In an identical manner, when the junction temperature $T_j$ is known (including the case in which the junction temperature $T_j$ is equal to the reference temperature $T_0$) and when the mounting stress $\sigma_f$ is known (including the case in which no mounting stress is loaded); as a result of simplifying conversion equation (9), it becomes possible to calculate the external force $\sigma_o$ in the x and y directions using Equation (17) given below.

$$\sigma_{x,0} = \sigma_x - y_x(T_j - T_0) - \sigma_{x,f}$$

$$\sigma_{y,0} = \sigma_y - y_y(T_j - T_0) - \sigma_{y,f} \quad (17)$$

As described above, according to the first embodiment, since conversion equations, which are meant for converting electrical resistance values into characteristic values such as temperature or stress of the semiconductor chips 50, are used as the model data; the characteristic value of each semiconductor chip 50 can be obtained in a more accurate manner from the electrical resistance value input from the detecting unit 30.

Figure 6:
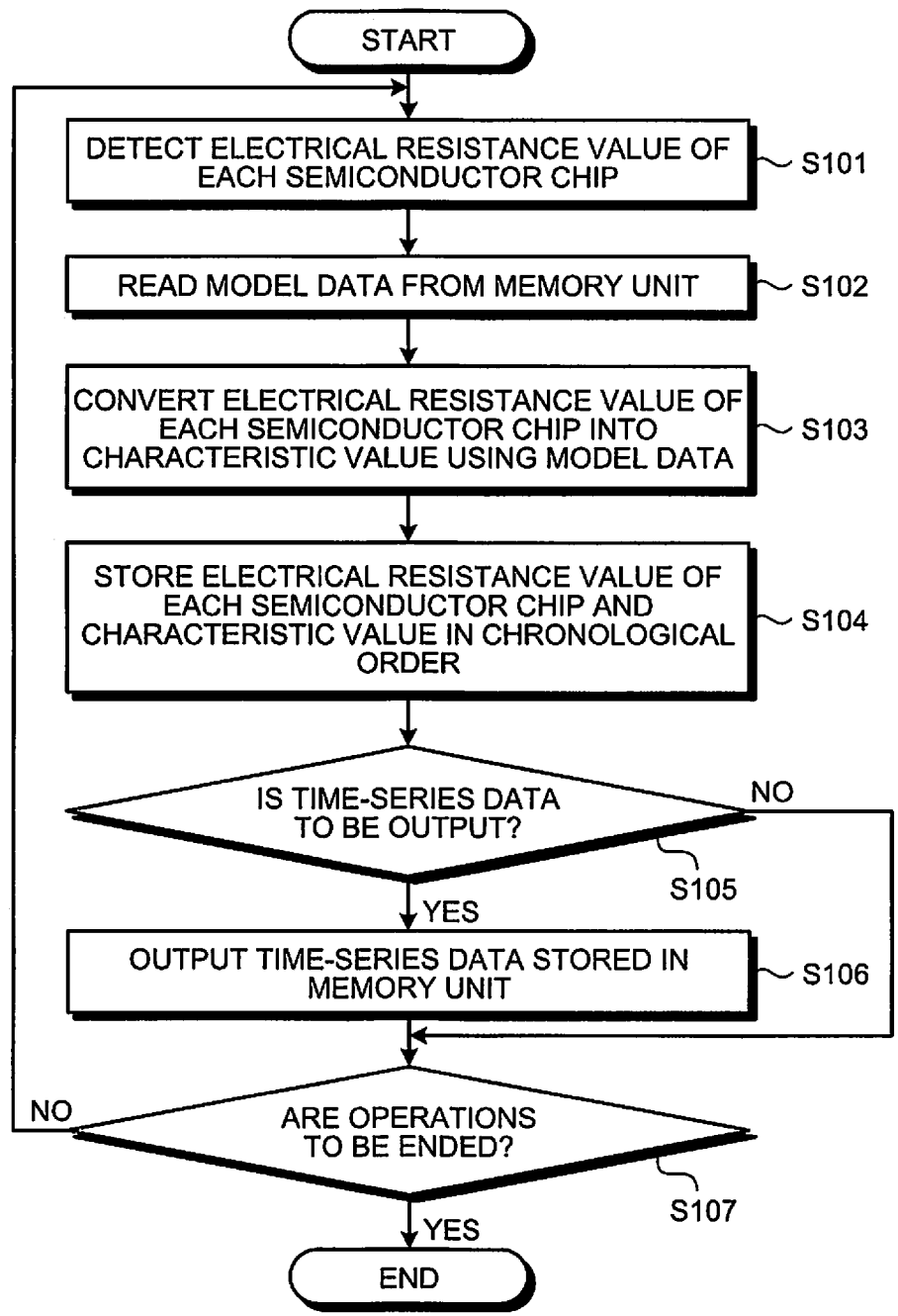
FIG. 6 is a flowchart for explaining an example of an inspection method according to the first embodiment.

Explained below with reference to a drawing is an inspection method implemented by an inspection device (or an inspection system) 100 according to the first embodiment. FIG. 6 is a flowchart for explaining an example of the inspection method according to the first embodiment.

As illustrated in FIG. 6, during the operations, firstly, the detecting unit 30 detects, as the electrical resistance value, the on-resistance value of each semiconductor chip 50 from the current value of the electric current input from each semiconductor chip 50 in operation (Step S101), and inputs the electrical resistance values to the converting unit 10. Meanwhile, the operation at Step S101 either can be performed while each semiconductor chip 50 is performing the normal operations, or can be performed at the time when the semiconductor chips 50 are made to perform different operations than the normal operations for the purpose of performing the operations illustrated in FIG. 6.

Then, the converting unit 10 reads, from the memory unit 20, the model data to be used in converting each electrical resistance value into a characteristic value such as temperature or stress (Step S102), and converts the input electrical resistance value of each semiconductor chip 50 into a characteristic value of that semiconductor chip 50 using the model data (Step S103).

Subsequently, in the memory unit 20, the converting unit 10 stores the following: the input electrical resistance values of the semiconductor chips 50; the characteristic values obtained by conversion of the electrical resistance values; and information enabling identification of the temporal sequence (for example, date and time information) (Step S104). As a result, time-series data of the electrical resistance values and time-series data of the characteristic values related to the semiconductor chips 50 gets stored in the memory unit 20. Meanwhile, alternatively, the electrical resistance values can be directly input from the detecting unit 30 to the memory unit 20 along with the information enabling identification of the temporal sequence (for example, data and time information).

Subsequently, the converting unit 10 determines whether or not to output the time-series data of the electrical resistance values or the time-series data of the characteristic values to the outside (Step S105). If it is determined to output the time-series data (Yes at Step S105), then the converting unit 10 reads the time-series data from the memory unit 20 and outputs it to the outside (Step S106). For example, if a request for the time-series data is issued by the externally-connected host device such as a personal computer, then the converting unit 10 determines to output the time-series data to the outside (Yes at Step S105), and reads the time-series data from the memory unit 20 and outputs it to the host device in a wired manner or a wireless manner (Step S106). On the other hand, if it is determined not to output the time-series data (No at Step S105), then the system control skips the operation at Step S106 and proceeds to Step S107.

At Step S107, it is determined whether or not to end the operations. For example, this determination can be performed either by the converting unit 10 or by a controller (not illustrated). If it is determined not to end the operations (No at Step S107), then the system control returns to Step S101. When it is determined to end the operations (Yes at Step S107), the operations are ended.

As described earlier, the time-series data that is stored in the memory unit 20 can be used in an analysis operation for cohesively analyzing, in a composite area of electricity/heat/stress, the characteristics and the condition of the semiconductor chips 50 while also covering the situations in the actually-used environment. In that regard, in the first embodiment, as an example of the analysis operation, the explanation is given for a failure prediction operation meant for predicting the failure time of each semiconductor chip 50.

Figure 7:
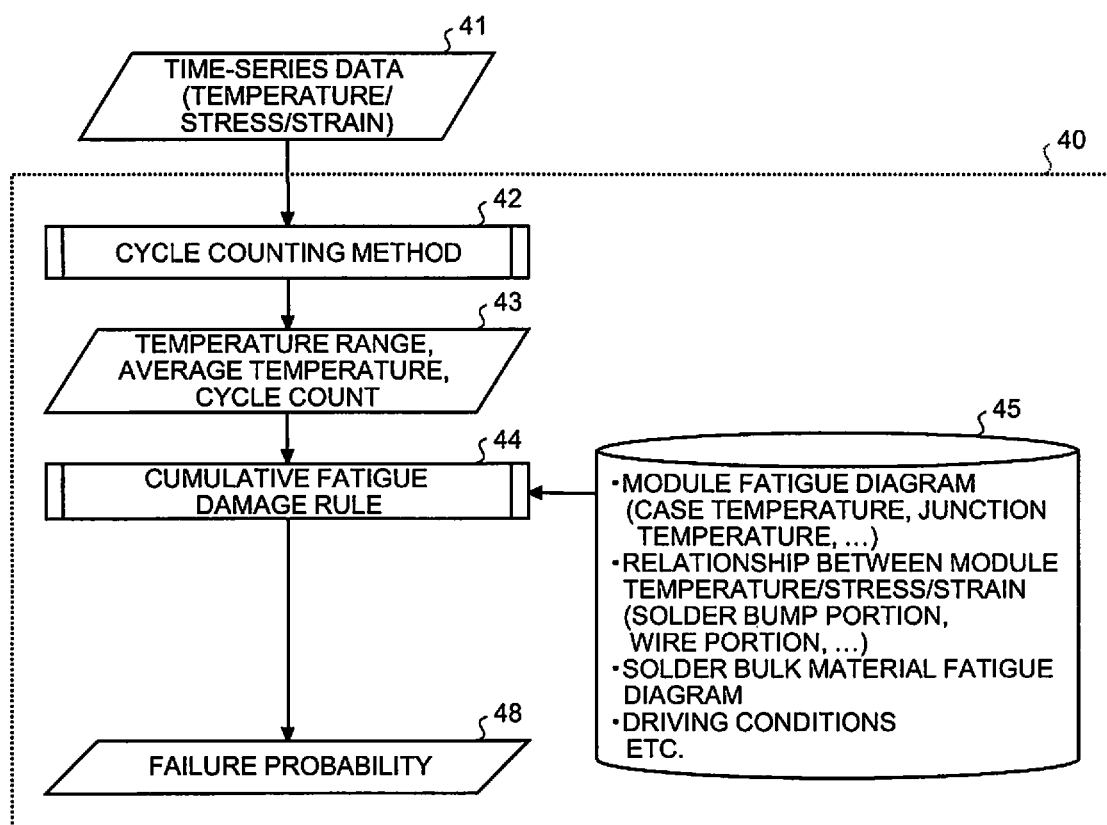
FIG. 7 is a diagram illustrating an exemplary overall configuration of an analyzing unit that performs a failure prediction operation according to the first embodiment.

FIG. 7 is a diagram illustrating an exemplary overall configuration of an analyzing unit that performs the failure prediction operation according to the first embodiment. An analyzing unit 40 illustrated in FIG. 7 is assumed to perform the failure prediction operation using time-series data related to the temperature, or the stress, or the strain, or all of the above (also called temperature history) from among the time-series data output from the inspection device 1. Moreover, with reference to FIG. 7, rectangular blocks represent analysis functions, blocks in parallelogram shape represent data, and a cylindrical block represents a database.

As illustrated in FIG. 7, when time-series data 41 of at least either the temperature, or the stress, or the strain is input from the inspection device 1, the analyzing unit 40 firstly applies a cycle counting method 42 with respect to the input time-series data 41 of at least either the temperature, or the stress, or the strain; and obtains (temperature range, average temperature, stress range, strain range, and cycle count) 43 of each cycle. Then, from the (temperature range, average temperature, strain range, stress range, and cycle count) 43 and from at least either the relationship between the temperature/strain/stress, or various fatigue diagrams, or driving conditions as stored in advance in a database 45; a failure probability 48 is obtained based on a cumulative fatigue damage rule 44.

Meanwhile, instead of performing the "failure prediction" as illustrated in FIG. 7, the analyzing unit 40 can be configured to perform: "failure detection" or "protection circuit" for taking measures such as device stoppage when the set temperature, the set stress, or the set strain exceeds the threshold; or "correction control circuit" for correcting the driving method according to the temperature/stress/strain; or "model correction circuit" for correcting the coefficients in the conversion equations of the resistance change rate that are stored in the memory unit 20; or "maintenance solution" for providing comprehensive maintenance service. Alternatively, the analyzing unit 40 can be configured to perform a combination of two or more of the abovementioned operations including "failure prediction".

As described above, according to the first embodiment, from the rate of change of electrical resistance (the resistance change rate) at the time of applying stress or temperature to a semiconductor from outside, in order to obtain the temperature of the semiconductor or the stress in each direction in the semiconductor, the dependency of the resistance change rate on the stress direction in the semiconductor (the stress loading direction) is taken into account. As a result, the temperature/stress/strain inside the semiconductor can be identified in more detail and with more accuracy, thereby enabling implementation of an inspection device, an inspection system, an inspection method, and a computer program product that enable achieving enhancement in the level of reliability of the semiconductor module.

Second Embodiment

A second embodiment of an inspection device, an inspection system, an inspection method, and a computer program product is described below in detail with reference to the accompanying drawings. In the second embodiment, the explanation is given about a more specific configuration example of the inspection device, the inspection system, the inspection method, and the computer program product according to the first embodiment. In the second embodiment, the constituent elements identical to the first embodiment are referred to by the same reference numerals, and the redundant explanation is not repeated.

Figure 8:
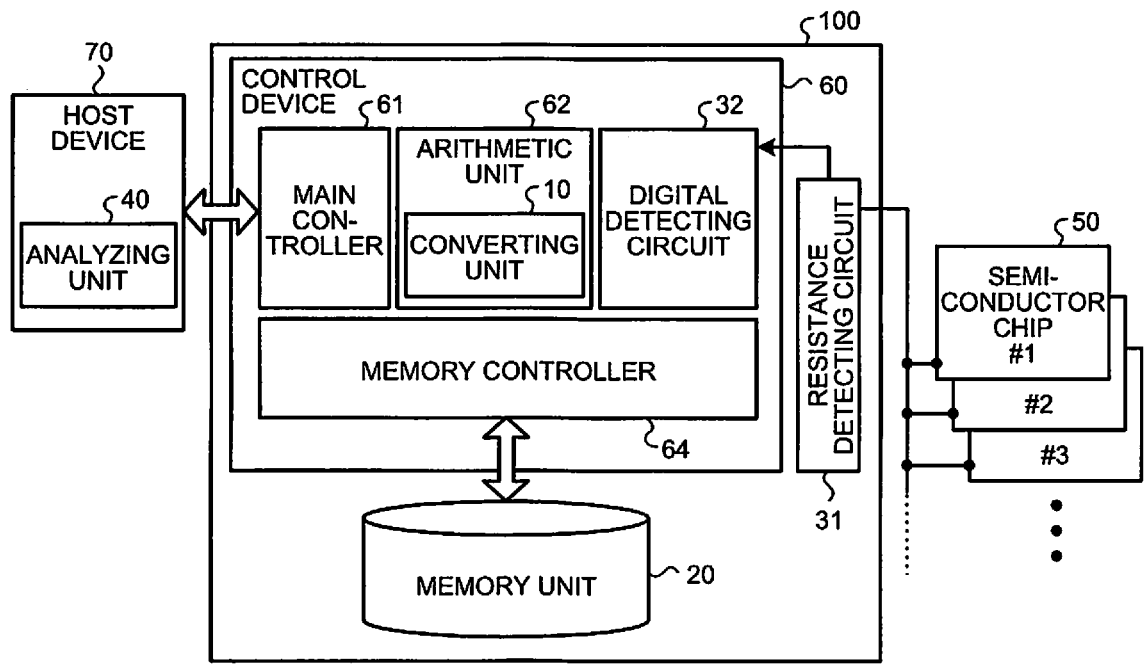
FIG. 8 is a block diagram illustrating an exemplary overall configuration of an inspection device (or an inspection system) according to a second embodiment.

FIG. 8 is a block diagram illustrating an exemplary overall configuration of the inspection device (or the inspection system) according to the second embodiment. As illustrated in FIG. 8, the inspection device 100 includes a control device 60, the memory unit 20, and a resistance detecting circuit 31.

As explained in the first embodiment, the memory unit 20 is a memory area configured using, for example, a DRAM or an SRAM and is used to hold model data meant for converting electrical resistance values into characteristic values such as temperature or stress of the semiconductor chips 50.

The resistance detecting circuit 31 is connected to, for example, a plurality of semiconductor chips 50; receives input of the electric current that flows during the operations of the semiconductor elements configured in each semiconductor chip 50; and, from the current-voltage characteristic indicating the relationship between the input electric current and the voltage applied for operating the semiconductor elements, detects the value, of the on-resistance of each semiconductor chip 50 as the analog electrical resistance value.

The control device 60 can be an integrated circuit such as a system-on-chip (SoC). The control device 60 includes a main controller 61, an arithmetic unit 62, a memory controller 64, and a digital detecting circuit 32. Herein, the main controller 61, the arithmetic unit 62, the memory controller 64, and the digital detecting circuit 32 are communicably connected to each other via an internal bus (not illustrated).

The main controller 61 is configured using, for example, an information processing device such as a central processing unit (CPU) and using an interface circuit of the wired type or the wireless type or a network card (NIC). The main controller 61 comprehensively controls the constituent elements of the control device 60, and performs communication of data and commands with an external host device 70 in the wired manner or the wireless manner.

The arithmetic unit 62 is configured using, for example, a digital signal processor (DSP), an information processing unit such as a CPU, and a memory area such as a random access memory (RAM); and performs various computations.

The memory controller 64 controls writing and reading of data with respect to the memory unit 20 that is configured using, for example, a DRAM or an SRAM.

The digital detecting circuit 32 is connected to the resistance detecting circuit 31, and converts the analog electrical resistance values detected by the resistance detecting circuit 31 into digital electrical resistance values.

In such a configuration, the resistance detecting circuit 31 and the digital detecting circuit 32 constitute the detecting unit 30 according to the first embodiment. Moreover, the converting unit 10 according to the first embodiment is implemented at least as a part of the functions of the arithmetic unit 62.

Thus, in the second embodiment, the analog electrical resistance values detected by the resistance detecting circuit 31 are converted into digital electrical resistance values by the digital detecting circuit 32. Then, the converting unit 10 of the arithmetic unit 62 converts the digital electrical resistance values into characteristic values using the model data read from the memory unit 20; and the characteristic values and the digital electrical resistance values, which are detected by the digital detecting circuit 32, are stored in chronological order in the memory unit 20.

Moreover, in response to a request from the host device 70, the main controller 61 reads the time-series data of the electrical resistance values and/or the time-series data of the characteristic values from the memory unit 20, and sends the read time-series data to the host device 70.

The host device 70 is configured using, for example, a personal computer or a smart device, and has various information processing functions. In the second embodiment, the host device 70 includes the analyzing unit 40 according to the first embodiment. Thus, the host device 70 inputs, to the analyzing unit 40, the time-series data received from the inspection device 100, and the analyzing unit 40 performs various operations such as the failure prediction operation. Then, the host device 70 outputs the result of the operations performed by the analyzing unit 40 to the user via a display (not illustrated) or a speaker (not illustrated).

The remaining configuration, the remaining operations, and the remaining effects are identical to the first embodiment. Hence, herein, the detailed explanation is not given again.

Third Embodiment

In the second embodiment, the resistance detecting circuit 31 is connected to, for example, a plurality of semiconductor chips 50; receives input of the electric current that flows during the operations of the semiconductor elements configured in each semiconductor chip 50; and, from the current-voltage characteristic indicating the relationship between the input electric current and the voltage applied for operating the semiconductor elements, detects the on-resistance value of each semiconductor chip 50 as the analog electrical resistance value. However, that is not the only possible configuration. In that regard, in a third embodiment, the explanation is given about a modification example of the second embodiment. In the third embodiment, the constituent elements identical to the embodiments described above are referred to by the same reference numerals, and the redundant explanation is not repeated.

Figure 9:
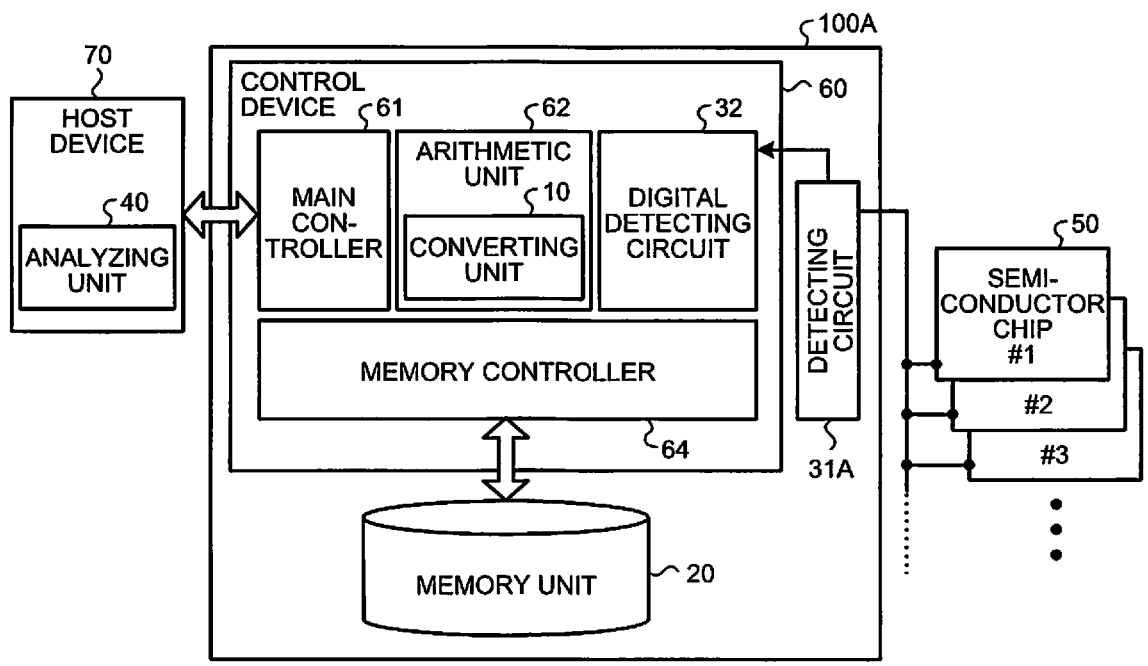
FIG. 9 is a block diagram illustrating an exemplary overall configuration of an inspection device (or an inspection system) according to a third embodiment.

FIG. 9 is a block diagram illustrating an exemplary overall configuration of an inspection device (or an inspection system) according to the third embodiment. As illustrated in FIG. 9, an inspection device 100A according to the third embodiment has an identical configuration to the inspection device 100 illustrated in FIG. 8, except that the resistance detecting circuit 31 is substituted with a detecting circuit 31A.

In the third embodiment, the detecting circuit 31A is connected to, for example, a plurality of semiconductor chips 50; receives input of the electric current that flows during the operations of the semiconductor elements configured in each semiconductor chip 50 as well as receives input of the voltage applied for operating the semiconductor elements; and outputs the electric current and the voltage to the digital detecting circuit 32.

The digital detecting circuit 32 is connected to the detecting circuit 31A, and converts the analog electric current and the analog voltage, which are detected by the detecting circuit 31A, into digital current values and digital voltage values, respectively. Then, the converting unit 10 of the arithmetic unit 62 converts the digital current values and the digital voltage values into electrical resistance values; converts the electrical resistance values into characteristic values using the model data read from the memory unit 20; and stores the characteristic values and the digital electrical resistance values, which are detected by the digital detecting circuit 32, in chronological order in the memory unit 20.

The remaining configuration, the remaining operations, and the remaining effects are identical to the embodiments described above. Hence, herein, the detailed explanation is not given again.

Fourth Embodiment

In the embodiments described above; the temperature, or the stress, or the strain is identified based on the information obtained from the semiconductor chips 50. However, that is not the only possible configuration. In that regard, in a fourth embodiment, the explanation is given about a case in which the temperature, or the stress, or the strain is identified based on the information obtained from the semiconductor chips 50 as well as based on the information obtained from sources other than the semiconductor chips 50. Although the following explanation is given based on the third embodiment, the explanation is also applicable in an identical manner to the other embodiments described earlier or described hereinafter. Moreover, in the fourth embodiment, the constituent elements identical to the embodiments described above are referred to by the same reference numerals, and the redundant explanation is not repeated.

Figure 10:
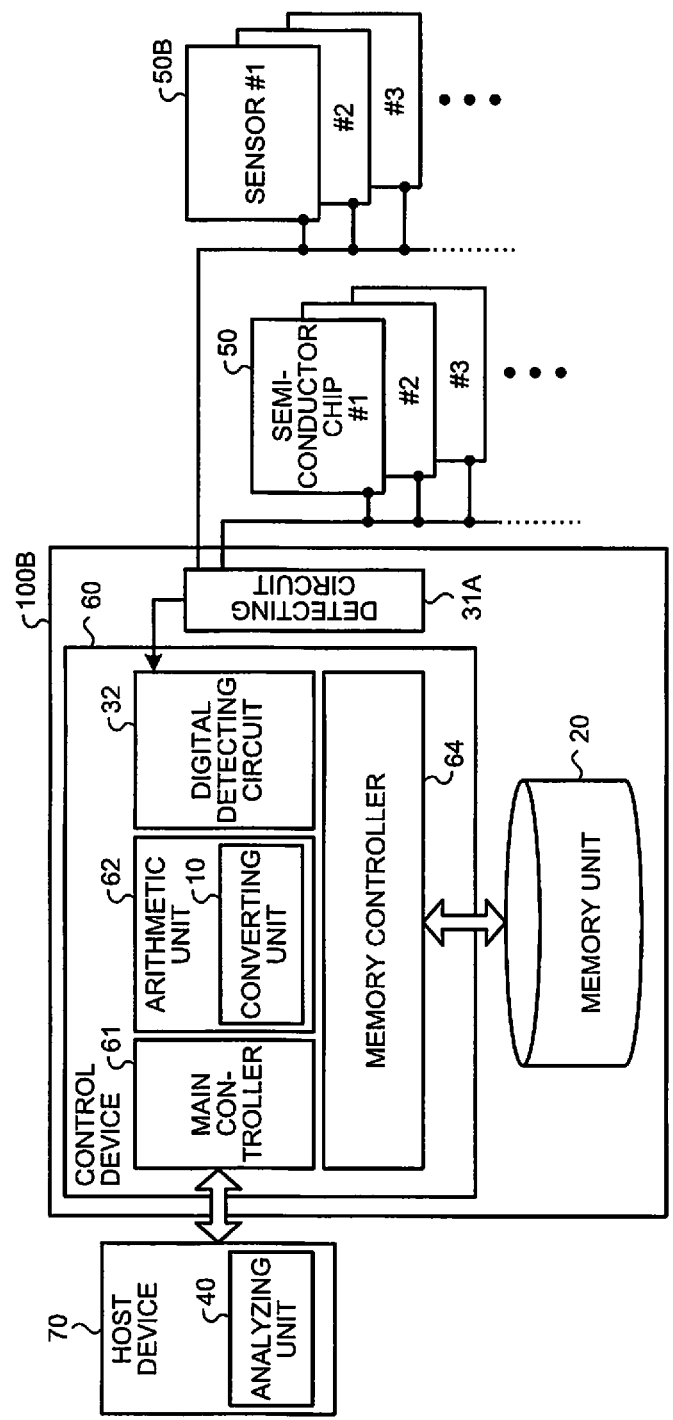
FIG. 10 is a block diagram illustrating an exemplary overall configuration of an inspection device (or an inspection system) according to a fourth embodiment.

FIG. 10 is a block diagram illustrating an exemplary overall configuration of an inspection device (or an inspection system) according to the fourth embodiment. As illustrated in FIG. 10, an inspection device 100B according to the fourth embodiment has an identical configuration to the inspection device 100A illustrated in FIG. 9, except that a plurality of sensors 50B is also installed.

In the fourth embodiment, the detecting circuit 31A is connected to, for example, a plurality of semiconductor chips 50 and a plurality of sensors 50B. The sensors 50B can be an arbitrary combination of arbitrary sensors such as temperature sensors, strain sensors, acceleration sensors, and humidity sensors.

The information about the temperature or the strain as obtained from the sensors 50B and the characteristic values obtained from the semiconductor chips 50 can be stored as time-series data in the memory unit 20. Moreover, in the fourth embodiment, for example, the arithmetic unit 62 can compare the information about the temperature or the strain as obtained from the sensors 50B with the characteristic values of the semiconductor chips 50, and can accordingly correct the model data (the coefficients in the conversion equations related to the on-resistance change rate) stored in the memory unit 20.

The remaining configuration, the remaining operations, and the remaining effects are identical to the embodiments described above. Hence, herein, the detailed explanation is not given again.

Fifth Embodiment

In the fourth embodiment, the temperature, or the stress, or the strain is identified using the information obtained from the semiconductor chips 50 and the sensors 50B. However, that is not the only possible configuration. In that regard, in the fifth embodiment, the explanation is given about a modification example of the fourth embodiment. In the fifth embodiment, the constituent elements identical to the embodiments described above are referred to by the same reference numerals, and the redundant explanation is not repeated.

Figure 11:
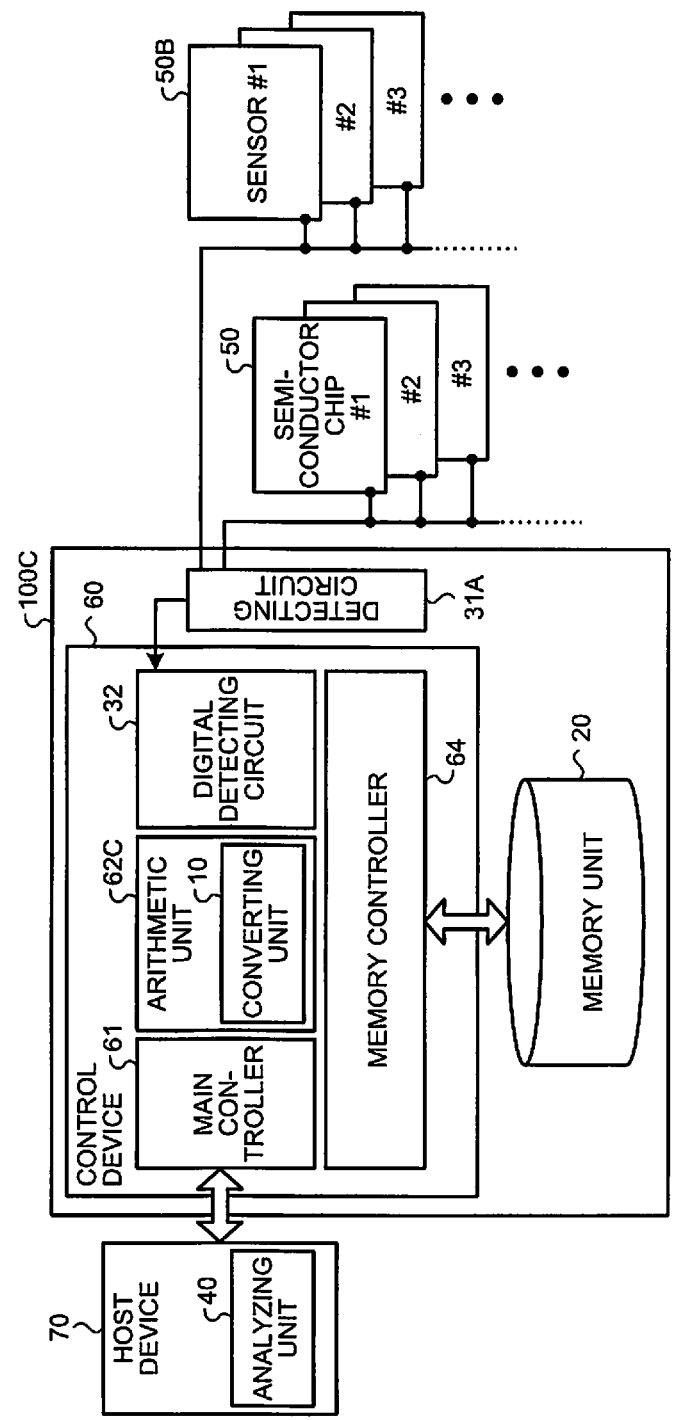
FIG. 11 is a block diagram illustrating an exemplary overall configuration of an inspection device (or an inspection system) according to a fifth embodiment.

FIG. 11 is a block diagram illustrating an exemplary overall configuration of an inspection device (or an inspection system) according to the fifth embodiment. As illustrated in FIG. 11, an inspection device 100C according to the fifth embodiment has an identical configuration to the inspection device 100B illustrated in FIG. 10, except that the arithmetic unit 62 is substituted with an arithmetic unit 62C.

The arithmetic unit 62C not only includes the converting unit 10 for performing conversion using the abovementioned conversion equations related to the on-resistance change rate $r_p$, but also has an arbitrary circuit analysis function for an electric circuit or a heat circuit, and has an arbitrary physical analysis function such as electromagnetic field analysis, thermo-fluid analysis, structural analysis, and device simulation using calculation methods such as the finite difference method, the finite volume method, and the finite element method.

Moreover, in the fifth embodiment, the memory unit 20 is used to store: the model data to be used by the converting unit 10; the time-series data of the electrical resistance values and/or the characteristics values; and various parameters to be used in performing various analysis operations such as circuit analysis and physical analysis. Examples of the parameters include physical property values, boundary conditions, and driving conditions. The arithmetic unit 62C uses the various parameters stored in the memory unit 20 and performs various analysis operations with respect to the characteristic values of the semiconductor chips 50 as stored in the memory unit 20 and with respect to the information obtained from the sensors 50B.

The physical property values that are stored in the memory unit 20 for the purpose of circuit analysis and physical analysis can include: elastic modulus, Poisson's ratio, linear coefficient of expansion, coefficient of thermal conductivity, heat resistance, specific heat, density, heat capacity, electrical conductivity, mobility of electrons/holes, and concentration of electrons/holes. The boundary conditions can include: shape of semiconductor chips, wiring pattern, module shape, heatsink shape, and device structure. The driving conditions can include: input voltage, duty ratio, frequency, gate resistance, and gate voltage.

The information about the temperature or the strain as obtained as a result of various analysis operations performed by the arithmetic unit 62C, the characteristic values obtained from the semiconductor chips 50, and the information obtained from various sensors can be stored as time-series data in the memory unit 20. Moreover, in the fifth embodiment, the information about the temperature or the strain as obtained as a result of various analysis operations performed by the arithmetic unit 62C can be compared with the characteristic values of the semiconductor chips 50, and the model data (the coefficients in the conversion equations related to the on-resistance change rate), the physical property values, the boundary conditions, and the driving conditions stored in the memory unit 20 can be corrected based on the result of comparison.

The remaining configuration, the remaining operations, and the remaining effects are identical to the embodiments described above. Hence, herein, the detailed explanation is not given again.

Sixth Embodiment

In the second to fifth embodiments described above, the explanation is given for a case in which the analyzing unit 40 is disposed on the outside of the inspection device 100 (for example, disposed in the host device 70). However, that is not the only possible configuration. In that regard, in a sixth embodiment, the explanation is given for a modification example of the second embodiment. In the sixth embodiment, the constituent elements identical to the embodiments described above are referred to by the same reference numerals, and the redundant explanation is not repeated.

Figure 12:
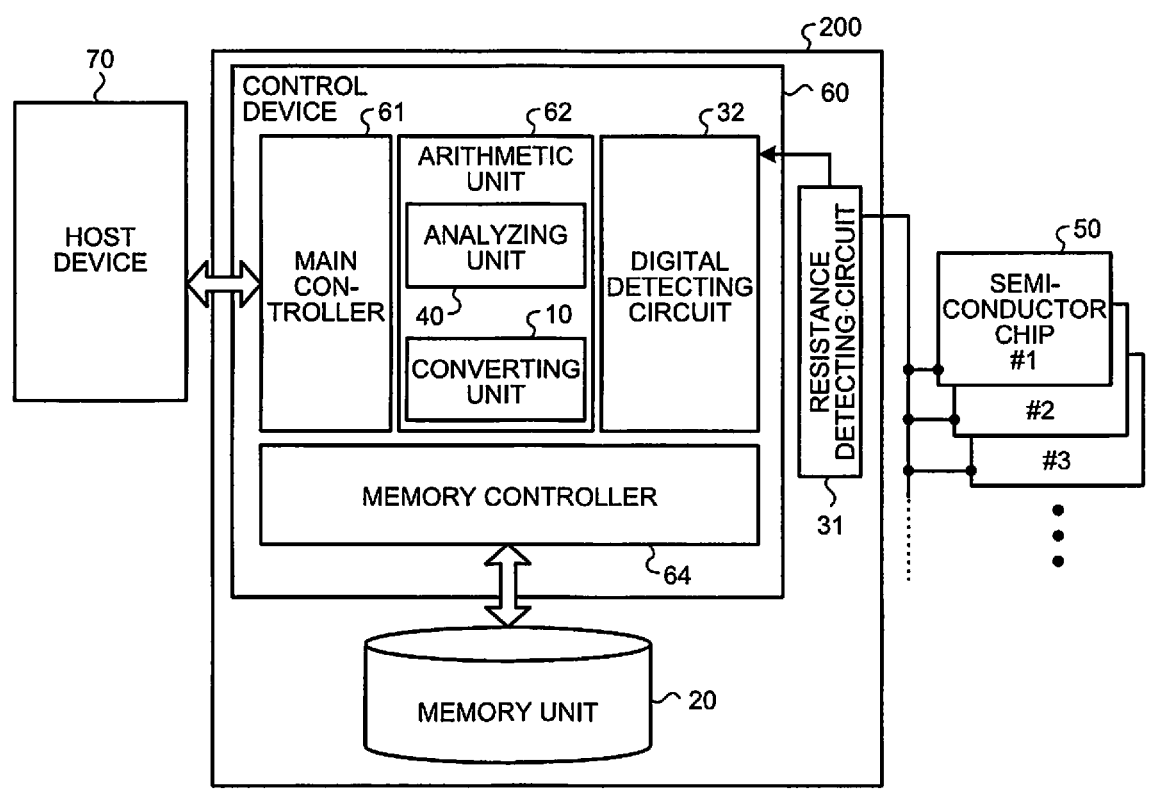
FIG. 12 is a block diagram illustrating an exemplary overall configuration of an inspection device (or an inspection system) according to a sixth embodiment.

FIG. 12 is a block diagram illustrating an exemplary overall configuration of an inspection device (or an inspection system) according to the sixth embodiment. As illustrated in FIG. 12, an inspection device 200 according to the sixth embodiment has an identical configuration to the inspection device 100 illustrated in FIG. 8, except that the analyzing unit 40 is disposed in the arithmetic unit 62 of the control device 60.

Thus, in the sixth embodiment, the arithmetic unit 62 reads the time-series data of the electrical resistance values and/or the time-series data of the characteristic values from the memory unit 20 in response to a request from the host device 70, and inputs the read time-series data to the analyzing unit 40. Then, the analysis result obtained by the analyzing unit 40 is output to the host device 70 via the main controller 61 and is then output to the user via a display (not illustrated) or a speaker (not illustrated).

The remaining configuration, the remaining operations, and the remaining effects are identical to the embodiments described above. Hence, herein, the detailed explanation is not given again.

Seventh Embodiment

In the second to sixth embodiments, the explanation is given for a case in which the converting unit 10 is disposed in the inspection device 100 or the inspection device 200. However, that is not the only possible configuration. In that regard, in a seventh embodiment, the explanation is given about a modification example of the second to sixth embodiments. In the seventh embodiment, although the modification example is based on the inspection device 100 illustrated in FIG. 8, it can alternatively be based on, for example, the inspection device 200 illustrated in FIG. 12. Moreover, in the seventh embodiment, the constituent elements identical to the embodiments described above are referred to by the same reference numerals, and the redundant explanation is not repeated.

Figure 13:
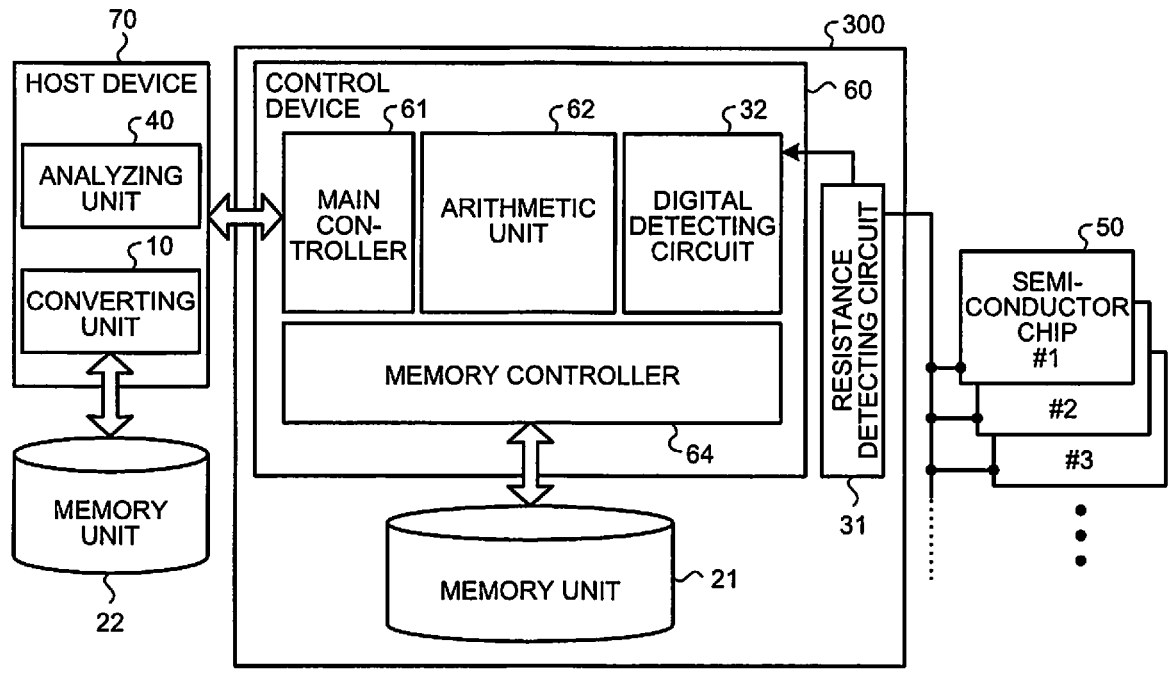
FIG. 13 is a block diagram illustrating an exemplary overall configuration of an inspection device (or an inspection system) according to a seventh embodiment.

FIG. 13 is a block diagram illustrating an exemplary overall configuration of an inspection device (or an inspection system) according to the seventh embodiment. As illustrated in FIG. 13, an inspection device 300 according to the seventh embodiment has an identical configuration to the inspection device 100 illustrated in FIG. 8, except that the converting unit 10 is disposed in the host device 70. Moreover, in the seventh embodiment, the memory unit 20 in the inspection device 100 (see FIG. 8) is divided into a memory unit 21 disposed in the inspection device 300 and a memory unit 22 connected to the host device 70.

The memory unit 21 in the inspection device 300 is used to hold, for example, time-series data of the digital electrical resistance values obtained by conversion by the digital detecting circuit 32. The memory unit 22 that is connected to the host device 70 is used to hold, for example, the model data meant for converting electrical resistance values into characteristic values such as temperature or stress of the semiconductor chips 50, and time-series data of the characteristic values that is obtained by converting the time-series data of the electrical resistance values, which is stored in the memory unit 21, using the model data.

Thus, in the seventh embodiment, the main controller 61 reads the time-series data of the electrical resistance values from the memory unit 21 in response to a request from the host device 70, and outputs the read time-series data to the host device 70. Then, the converting unit 10 in the host device 70 converts the time-series data of the electrical resistance values into time-series data of characteristic values using the model data, and stores the time-series data of the characteristic values in the memory unit 22. At that time, the time-series data of the electrical resistance values can also be stored in the memory unit 22. Subsequently, for example, in response to an instruction input by the user in the host device 70, the time-series data of the electrical resistance values and/or the time-series data of the characteristic values are input from the memory unit 22 to the analyzing unit 40, and the analysis result obtained by the analyzing unit 40 is then output to the user via a display (not illustrated) or a speaker (not illustrated).

The remaining configuration, the remaining operations, and the remaining effects are identical to the embodiments described above. Hence, herein, the detailed explanation is not given again.

Eighth Embodiment

As described earlier, in recent years, an intelligent power module has been developed that represents a module having a memory and an arithmetic circuit installed therein. In that regard, in an eighth embodiment, a case in which the inspection device according to the embodiments described above is treated as an intelligent power module is described in detail with reference to the accompanying drawings. In the eighth embodiment, the inspection device 100 illustrated in FIG. 8 is treated as an intelligent power module. However, that is not the only possible configuration. Alternatively, for example, the inspection device 200 illustrated in FIG. 12 or the inspection device 300 illustrated in FIG. 13 can be treated as an intelligent power module. In the eighth embodiment, the constituent elements identical to the embodiments described above are referred to by the same reference numerals, and the redundant explanation is not repeated.

Figure 14:
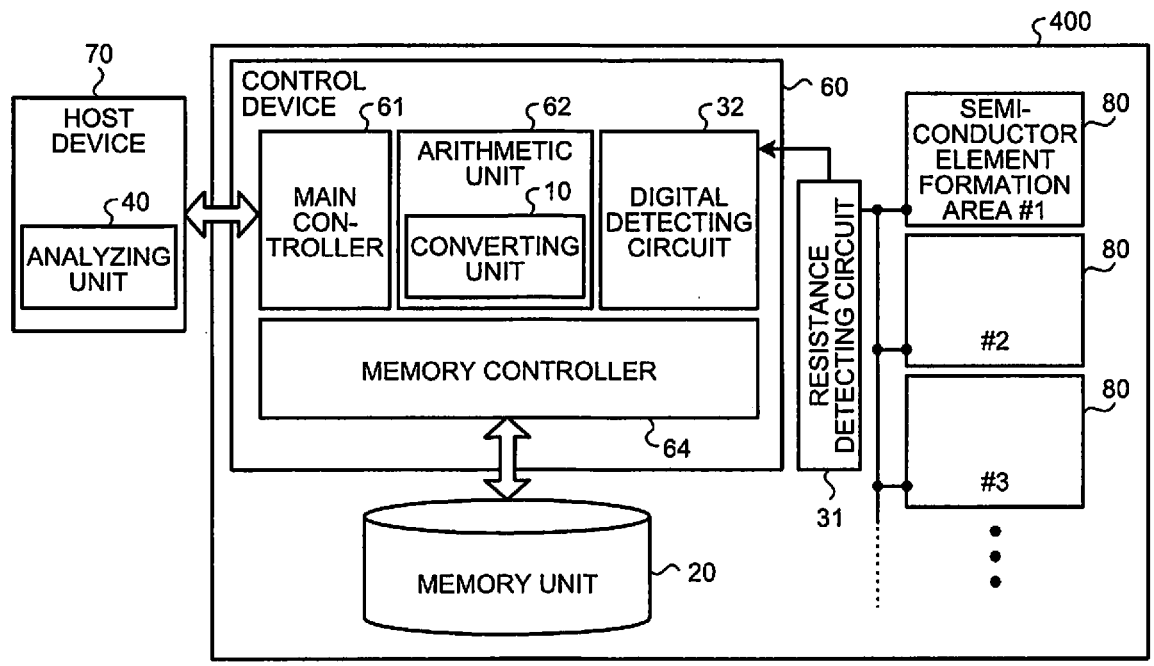
FIG. 14 is a block diagram illustrating an exemplary overall configuration of an intelligent power module according to an eighth embodiment.

FIG. 14 is a block diagram illustrating an exemplary overall configuration of an intelligent power module according to the eighth embodiment. As illustrated in FIG. 14, an intelligent power module 400 according to the eighth embodiment has an identical configuration to the inspection device 100 illustrated in FIG. 8, except that the inspection device 100 is modularized as the intelligent power module 400 and that a plurality of semiconductor chips 50 is embedded as a plurality of semiconductor element formation areas 80 in the intelligent power module 400.

The remaining configuration, the remaining operations, and the remaining effects are identical to the embodiments described above. Hence, herein, the detailed explanation is not given again.

Meanwhile, in the embodiments described above, although a semiconductor device having the SiC substrate $50a$ is used as the semiconductor chip 50, that is not the only possible configuration. Alternatively, for example, a semiconductor device in which the SiC substrate $50a$ is substituted with a silicon (Si) substrate, or a gallium nitride (GaN) substrate, or a gallium oxide ($Ga_2O_3$) substrate can be used as the semiconductor chip 50.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inspection device comprising:
    detecting circuitry connected to a plurality of semiconductor chips having mutually different rates of change of electrical resistance with respect to stress loading direction, the detecting circuitry functioning as a detecting unit to detect an electrical resistance value of each semiconductor chip from electric current flowing in each semiconductor chip;
    a memory including a first memory unit to hold model data meant for converting an electrical resistance value into a characteristic value indicating at least either temperature, or stress, or strain; and
    a hardware processor connected to the memory, the hardware processor functioning as a converting unit to:
        convert the electrical resistance value of each semiconductor chip as detected by the detecting circuitry into the characteristic value using the model data held in the first memory unit,
        store, in a second memory unit included in the memory, the characteristic value as time-series data for each of the plurality of semiconductor chips, and
        read out the time-series data from the second memory unit and output the readout time-series data to the outside of the inspection device,
    wherein the model data represents a conversion equation for converting rate of change of the electrical resistance value into the characteristic value,
    when $\Delta R_{on}$ represents amount of change in electrical resistance of each semiconductor chip, when $R_{on}$ represents electrical resistance value in state in which no stress is applied to each semiconductor chip, and when $r_p$ represents change rate in electrical resistance in response to application of stress to each semiconductor chip, the conversion equation is expressed using Equation (1) given below, and $$\Delta R_{on} = R_{on} \times r_p \qquad (1)$$

when α represents coefficient indicating relationship between temperature and stress-resistance change rate, when β represents coefficient indicating relationship between stress and resistance change rate, when γ represents coefficient indicating relationship between temperature and heat stress, when $\sigma_o$ represents external force, when $\sigma_f$ represents mounting stress, when $T_j$ represents junction temperature, and when $T_0$ represents reference temperature, the change rate $r_p$ in electrical resistance as given in the Equation (1) is expressed using Equation (2) given below $$\begin{aligned}r_p &= r_p(\sigma_x, \sigma_y, T_j) \qquad (2)\\ &= \{\alpha_x(T_j - T_0) + 1\}\beta_x\{\gamma_x(T_j - T_0) + \sigma_{x,f} + \sigma_{x,0}\} + \\ &\quad \{\alpha_y(T_j - T_0) + 1\}\beta_y\{\gamma_y(T_j - T_0) + \sigma_{y,f} + \sigma_{y,0}\}.\end{aligned}$$

2. The inspection device according to claim 1, wherein the memory further includes a third memory unit that is used to hold the electrical resistance value of each semiconductor chip as obtained by the detecting unit as time-series data for each of the plurality of semiconductor chips.

3. The inspection device according to claim 1, wherein the conversion equation includes, with respect to rate of change of electrical resistance, at least either temperature, or stress component in each direction, or strain component in each direction.

4. The inspection device according to claim 3, wherein the stress component in each direction includes at least either heat stress component, or mounting stress component, or external force component.

5. The inspection device according to claim 3, wherein the strain component in each direction includes at least either heat strain component, or strain component attributed to mounting, or strain component attributed to external force.

6. The inspection device according to claim 4, wherein the conversion equation includes a coefficient indicating relationship between temperature and stress-resistance change rate.

7. The inspection device according to claim 4, wherein, when the external force and the mounting stress are known, the converting unit identifies the temperature from rate of change of the electrical resistance using the conversion equation.

8. The inspection device according to claim 4, wherein, when the temperature and the external force are known, the converting unit identifies the mounting stress using the conversion equation.

9. The inspection device according to claim 4, wherein, when the temperature and the mounting stress are known, the converting unit identifies the external force using the conversion equation.

10. The inspection device according to claim 1, wherein each semiconductor chip includes a silicon carbide substrate that is so disposed that <11-20> direction thereof is parallel to main stress loading direction.

11. The inspection device according to claim 1, further comprising an analyzing unit that calculates failure probability of each semiconductor chip using the time-series data of the characteristic values of each of the plurality of semiconductor chips as stored in the second memory unit.

12. The inspection device according to claim 1, further comprising:

one or more sensors, wherein the hardware processor is configured to further function as an arithmetic unit to compare information obtained from the one or more sensors with the characteristic values, and correct the model data held in the first memory unit.

13. The inspection device according to claim 12, wherein the arithmetic unit has a function of performing an analysis operation using at least either the information obtained from the one or more sensors or the characteristic value, and the first memory unit is used store parameters to be used by the arithmetic unit at time of performing the analysis operation.

14. An intelligent power module comprising:

the inspection device according to claim 1; and the plurality of semiconductor chips according to claim 1, which are embedded as a plurality of semiconductor element formation areas in the intelligent power module having mutually different rates of change of electrical resistance with respect to stress loading direction.

15. An inspection method implemented by a computer, the inspection method comprising:

detecting, from electric current flowing in each of a plurality of semiconductor chips having mutually different rates of change of electrical resistance with respect to stress loading direction, an electrical resistance value of each semiconductor chip;

converting the detected electrical resistance value of each semiconductor chip into a characteristic value, which indicates at least either temperature, or stress, or strain, using model data meant for converting an electrical resistance value into the characteristic value;

storing, in a memory of the computer, the characteristic value, which is obtained by conversion, as time-series data for each of the plurality of semiconductor chips; and reading out the time-series data from the memory and outputting the readout time-series data to the outside of the computer, wherein the model data represents a conversion equation for converting rate of change of the electrical resistance value into the characteristic value, when $\Delta R_{on}$ represents amount of change in electrical resistance of each semiconductor chip, when $R_{on}$ represents electrical resistance value in state in which no stress is applied to each semiconductor chip, and when $r_p$ represents change rate in electrical resistance in response to application of stress to each semiconductor chip, the conversion equation is expressed using Equation (1) given below, and $$\Delta R_{on} = R_{on} \times r_p \qquad (1)$$

when α represents coefficient indicating relationship between temperature and stress-resistance change rate,
when β represents coefficient indicating relationship between stress and resistance change rate,
when γ represents coefficient indicating relationship between temperature and heat stress,
when $\sigma_o$ represents external force,
when $\sigma_f$ represents mounting stress,
when $T_j$ represents junction temperature, and
when $T_0$ represents reference temperature,
the change rate $r_p$ in electrical resistance as given in the Equation (1) is expressed using Equation (2) given below $$r_p = r_p(\sigma_x, \sigma_y, T_j) \quad (2)$$
$$= \{\alpha_x(T_j - T_0) + 1\}\beta_x\{\gamma_x(T_j - T_0) + \sigma_{x,f} + \sigma_{x,0}\} +$$
$$\{\alpha_y(T_j - T_0) + 1\}\beta_y\{\gamma_y(T_j - T_0) + \sigma_{y,f} + \sigma_{y,0}\}.$$

16. A computer program product having a non-transitory computer readable medium including programmed instructions, wherein the instructions, when executed by a processor installed in an inspection device that is connected to a plurality of semiconductor chips having mutually different rates of change of electrical resistance with respect to stress loading direction, cause the processor to perform:
 detecting, from electric current flowing in each of the plurality of semiconductor chips, an electrical resistance value of each semiconductor chip;
 converting the detected electrical resistance value of each semiconductor chip into a characteristic value, which indicates at least either temperature, or stress, or strain, using model data meant for converting an electrical resistance value storing, in a memory of the inspection device, the characteristic value, which is obtained by conversion, as time-series data for each of the plurality of semiconductor chips into the characteristic value; and reading out the time-series data from the memory and outputting the readout time-series data to the outside of the inspection device,
wherein the model data represents a conversion equation for converting rate of change of the electrical resistance value into the characteristic value,
when $\Delta R_{on}$ represents amount of change in electrical resistance of each semiconductor chip,
when $R_{on}$ represents electrical resistance value in state in which no stress is applied to each semiconductor chip, and
when $r_p$ represents change rate in electrical resistance in response to application of stress to each semiconductor chip,
the conversion equation is expressed using Equation (1) given below, and $$\Delta R_{on} = R_{on} \times r_p \quad (1)$$

when α represents coefficient indicating relationship between temperature and stress-resistance change rate,
when β represents coefficient indicating relationship between stress and resistance change rate,
when γ represents coefficient indicating relationship between temperature and heat stress,
when $\sigma_o$ represents external force,
when $\sigma_f$ represents mounting stress,
when $T_j$ represents junction temperature, and
when $T_0$ represents reference temperature,
the change rate $r_p$ in electrical resistance as given in the Equation (1) is expressed using Equation (2) given below $$r_p = r_p(\sigma_x, \sigma_y, T_j) \quad (2)$$
$$= \{\alpha_x(T_j - T_0) + 1\}\beta_x\{\gamma_x(T_j - T_0) + \sigma_{x,f} + \sigma_{x,0}\} +$$
$$\{\alpha_y(T_j - T_0) + 1\}\beta_y\{\gamma_y(T_j - T_0) + \sigma_{y,f} + \sigma_{y,0}\}.$$

* * * * *